US009049535B2

(12) United States Patent  (10) Patent No.: US 9,049,535 B2
Othmer et al.  (45) Date of Patent: *Jun. 2, 2015

(54) RECORDING A VOICE MESSAGE IN RESPONSE TO TERMINATION OF A PUSH-TO-TALK SESSION

(75) Inventors: Konstantin Othmer, Mountain View, CA (US); Michael P. Ruf, Parkland, FL (US)

(73) Assignee: SMITH MICRO SOFTWARE, INC., Aliso Viejo, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 13/618,190

(22) Filed: Sep. 14, 2012

(65) Prior Publication Data

US 2013/0012170 A1  Jan. 10, 2013

Related U.S. Application Data

(63) Continuation of application No. 11/769,608, filed on Jun. 27, 2007, now Pat. No. 8,548,433.

(51) Int. Cl.
*H04W 4/00* (2009.01)
*H04W 76/00* (2009.01)

(52) U.S. Cl.
CPC .............. *H04W 4/00* (2013.01); *H04W 76/005* (2013.01)

(58) Field of Classification Search
CPC ............................. H04W 4/10; H04W 76/005
See application file for complete search history.

(56) References Cited

U.S. PATENT DOCUMENTS

| 4,856,066 | A | 8/1989 | Lemelson |
| 5,146,487 | A | 9/1992 | Bergsman et al. |
| 5,313,515 | A | 5/1994 | Allen et al. |
| 5,483,580 | A | 1/1996 | Brandman et al. |
| 5,646,982 | A | 7/1997 | Hogan et al. |
| 5,675,507 | A | 10/1997 | Bobo, II |
| 5,697,060 | A | 12/1997 | Akahane |
| 5,751,791 | A | 5/1998 | Chen et al. |
| 5,781,614 | A | 7/1998 | Brunson |
| 5,844,969 | A | 12/1998 | Goldman et al. |
| 5,855,003 | A | 12/1998 | Ladden et al. |
| 5,889,840 | A | 3/1999 | Lang et al. |
| 5,905,774 | A | 5/1999 | Tatchell |
| 5,951,638 | A | 9/1999 | Hoss et al. |

(Continued)

FOREIGN PATENT DOCUMENTS

EP  1113631 A2  7/2001

OTHER PUBLICATIONS

U.S. Appl. No. 11/828,251, filed Jul. 25, 2007, Ruf et al.

(Continued)

*Primary Examiner* — Benjamin Lamont
(74) *Attorney, Agent, or Firm* — Workman Nydegger (57) ABSTRACT

Voice messaging services are used to provide messages for recipients associated with terminated network-based instant connect communication sessions. A first device engages in a communication session with a second device. The communication session between the two devices terminates and the first device records locally a voice message addressed to the second device. The message may be stored on the first device and transmitted to the second device after another communication session is established between the two devices. Alternately, the voice message may be transmitted to a message server and forwarded to the second device at a later time.

18 Claims, 4 Drawing Sheets

(56) References Cited

U.S. PATENT DOCUMENTS

| | | |
|---|---|---|
| 5,974,449 A | 10/1999 | Chang et al. |
| 6,014,375 A | 1/2000 | Janky |
| 6,014,568 A | 1/2000 | Alperovich et al. |
| 6,038,296 A | 3/2000 | Brunson et al. |
| 6,052,384 A | 4/2000 | Huang |
| 6,052,440 A | 4/2000 | Yuhn |
| 6,075,844 A | 6/2000 | Goldberg et al. |
| 6,097,941 A | 8/2000 | Helferich |
| 6,144,644 A | 11/2000 | Bajzath et al. |
| 6,175,856 B1 | 1/2001 | Riddle |
| 6,198,808 B1 | 3/2001 | Martin |
| 6,233,318 B1 | 5/2001 | Picard et al. |
| 6,282,270 B1 | 8/2001 | Porter |
| 6,304,752 B1 | 10/2001 | Rignell |
| 6,335,962 B1 | 1/2002 | Ali et al. |
| 6,343,216 B1 | 1/2002 | Kim |
| 6,396,908 B1 | 5/2002 | O'Donovan et al. |
| 6,418,307 B1 | 7/2002 | Amin |
| 6,438,217 B1 | 8/2002 | Huna |
| 6,463,131 B1 | 10/2002 | French-St. George et al. |
| 6,519,479 B1 | 2/2003 | Garudadri et al. |
| 6,597,702 B1 | 7/2003 | Caugherty |
| 6,630,883 B1 | 10/2003 | Amin et al. |
| 6,636,733 B1 | 10/2003 | Helferich |
| 6,654,448 B1 | 11/2003 | Agraharam et al. |
| 6,654,786 B1 | 11/2003 | Fox et al. |
| 6,731,734 B1 | 5/2004 | Shaffer et al. |
| 6,731,926 B1 | 5/2004 | Link et al. |
| 6,751,477 B1 | 6/2004 | Alperovich et al. |
| 6,785,363 B2 | 8/2004 | Culliss |
| 6,799,033 B2 | 9/2004 | Kanefsky |
| 6,826,264 B2 | 11/2004 | Valco et al. |
| 6,865,259 B1 | 3/2005 | Shaffer et al. |
| 6,882,708 B1 | 4/2005 | Bedingfield et al. |
| 6,934,552 B2 | 8/2005 | Holley et al. |
| 6,954,136 B2 | 10/2005 | Sauer |
| 7,002,992 B1 | 2/2006 | Shaffer et al. |
| 7,013,155 B1 | 3/2006 | Ruf et al. |
| 7,031,437 B1 | 4/2006 | Parsons et al. |
| 7,042,990 B2 | 5/2006 | Marsot |
| 7,076,245 B1 | 7/2006 | Satapathy |
| 7,133,687 B1 | 11/2006 | El-Fishawy et al. |
| 7,151,923 B2 | 12/2006 | Boland et al. |
| 7,233,788 B2 | 6/2007 | Kedem |
| 7,251,480 B1 | 7/2007 | Oh et al. |
| 7,317,929 B1 | 1/2008 | El-Fishawy et al. |
| 7,536,180 B2 * | 5/2009 | Yoon et al. .................. 455/418 |
| 7,873,390 B2 | 1/2011 | Cohen et al. |
| 2001/0008556 A1 | 7/2001 | Bauer et al. |
| 2002/0006782 A1 | 1/2002 | Kim |
| 2002/0046315 A1 | 4/2002 | Miller et al. |
| 2002/0071396 A1 | 6/2002 | Lee et al. |
| 2002/0103003 A1 | 8/2002 | Mauro |
| 2002/0115429 A1 | 8/2002 | Deluca et al. |
| 2002/0194388 A1 | 12/2002 | Boloker et al. |
| 2003/0028604 A1 | 2/2003 | Aktas et al. |
| 2003/0043782 A1 | 3/2003 | Laursen et al. |
| 2003/0055655 A1 | 3/2003 | Suominen |
| 2003/0087632 A1 | 5/2003 | Sagi et al. |
| 2003/0134617 A1 | 7/2003 | Duerk et al. |
| 2003/0195006 A1 | 10/2003 | Choong et al. |
| 2004/0022237 A1 | 2/2004 | Elliott et al. |
| 2004/0176139 A1 | 9/2004 | Wang |
| 2004/0203780 A1 | 10/2004 | Julka et al. |
| 2004/0224678 A1 | 11/2004 | Dahood et al. |
| 2005/0083910 A1 | 4/2005 | Hallin et al. |
| 2005/0143056 A1 | 6/2005 | Iyer et al. |
| 2005/0266829 A1 | 12/2005 | Tran et al. |
| 2006/0089131 A1 | 4/2006 | Hunag |
| 2006/0094472 A1 | 5/2006 | Othmer et al. |
| 2006/0189333 A1 | 8/2006 | Othmer |
| 2007/0155415 A1 * | 7/2007 | Sheehy et al. ............... 455/518 |
| 2008/0101221 A1 | 5/2008 | Mallet |
| 2008/0153526 A1 | 6/2008 | Othmer |
| 2009/0124237 A1 * | 5/2009 | Minami et al. ............ 455/412.1 |
| 2009/0203357 A1 | 8/2009 | Harris et al. |
| 2009/0298529 A1 | 12/2009 | Mahajan |

OTHER PUBLICATIONS

U.S. Appl. No. 12/435,766, filed May 5, 2009, Othmer.
U.S. Appl. No. 11/769,608, filed Jun. 27, 2007, Othmer et al.
International Telecommunication Union, Series V: Data Communication Over the Telephone Network; Procedures for the simultaneous transmission of data and digitally encoded voice signals over the GTSN, or over 2-wire leased point-to-point telephone type circuits; ITU-T Recommendation V.70; Aug. 1996.
El-Fishawy et al. "Delivery of Voice Data from Multimedia Messaging Service Messages" U.S. Appl. No. 11/007,700, filed Dec. 8, 2004. See Office Actions mailed Jun. 15, 2006 and May 2, 2007.
U.S. Appl. No. 10/407,955, Jun. 15, 2005, Office Action.
U.S. Appl. No. 10/407,955, Dec. 8, 2005, Notice of Allowance.
U.S. Appl. No. 10/661,033, Jul. 28, 2005, Office Action.
U.S. Appl. No. 10/661,033, Jan. 12, 2006, Final Office Action.
U.S. Appl. No. 10/661,033, Sep. 14, 2006, Notice of Allowance.
U.S. Appl. No. 11/828,251, Sep. 13, 2010, Office Action.
U.S. Appl. No. 11/828,251, Mar. 24, 2011, Final Office Action.
U.S. Appl. No. 11/828,251, Jul. 18, 2011, Office Action.
U.S. Appl. No. 11/828,251, Dec. 27, 2011, Final Office Action.
U.S. Appl. No. 11/828,251, Mar. 12, 2012, Advisory Action.
U.S. Appl. No. 11/828,251, Apr. 12, 2012, Office Action.
U.S. Appl. No. 11/077,700, Jun. 15, 2006, Office Action.
U.S. Appl. No. 11/077,700, Oct. 6, 2006, Office Action.
U.S. Appl. No. 11/077,700, May 2, 2007, Office Action.
U.S. Appl. No. 11/077,700, Jun. 21, 2007, Notice of Allowance.
U.S. Appl. No. 11/077,770, Sep. 14, 2007, Notice of Allowance.
U.S. Appl. No. 11/129,126, Oct. 1, 2007, Notice of Allowance.
U.S. Appl. No. 12/046,285, Aug. 6, 2008, Office Action.
U.S. Appl. No. 12/046,285, Feb. 9, 2009, Notice of Allowance.
U.S. Appl. No. 12/435,766, Jun. 14, 2012, Restriction Requirement.
U.S. Appl. No. 11/300,522, Apr. 3, 2008, Office Action.
U.S. Appl. No. 11/300,522, Dec. 30, 2008, Final Office Action.
U.S. Appl. No. 11/769,608, Aug. 20, 2009, Office Action.
U.S. Appl. No. 11/769,608, May 17, 2010, Final Office Action.
U.S. Appl. No. 11/769,608, Dec. 28, 2010, Office Action.
U.S. Appl. No. 11/769,608, May 25, 2011, Final Office Action.
U.S. Appl. No. 11/769,608, Jun. 27, 2012, Notice of Allowance.
U.S. Appl. No. 12/435,766, Sep. 5, 2012, Office Action.
U.S. Appl. No. 12/435,766, Mar. 22, 2013, Final OA.
U.S. Appl. No. 11/828,251, May 9, 2013, Notice of Allowance.
U.S. Appl. No. 12/435,766, May 30, 2013, Advisory Action.
U.S. Appl. No. 11/769,608, May 24, 2013, Notice of Allowance.
U.S. Appl. No. 12/435,766, Jul. 19, 2013, Office Action.

* cited by examiner

RECORDING A VOICE MESSAGE IN RESPONSE TO TERMINATION OF A PUSH-TO-TALK SESSION

CROSS-REFERENCE TO RELATED APPLICATIONS

This application is a continuation of U.S. patent application Ser. No. 11/769,608 filed on Jun. 27, 2007 and entitled "VOICE MESSAGING SERVICE FOR NETWORK-BASED INSTANT CONNECT SYSTEMS," which application is hereby expressly incorporated herein in its entirety.

BACKGROUND OF THE INVENTION

1. The Field of the Invention

The present invention relates to voice messaging systems. More specifically, embodiments of the present invention relate to voice messaging systems for terminated communication sessions, particularly for network-based instant connect communication sessions.

2. The Relevant Technology

During recent years, various forms of mobile communication devices using radio signals have become more widely used. An early example of mobile communication, and one which has been in use for decades, is two-way radio devices, commonly known as "walkie-talkies." One of the convenient features of walkie-talkies is the ability to immediately initiate communication with recipients without requiring the user who initiates the communication to input a telephone number or to wait while call setup is performed. Instead, the user merely presses a button on the mobile communication device and begins speaking. Any recipient device that is within range and is tuned to the selected frequency immediately receives the voice data. The receiving party can immediately receive the communication without having to respond to a ring or other audible signal, such as those that have been associated with the act of answering a ringing telephone.

A typical walkie-talkie communication session occurs when participating devices are tuned in to a particular radio frequency. The communication session is a half-duplex event and the data can only flow in one direction at a time. In contrast, in a full-duplex communication session data can flow in both directions at one time. For example, mobile telephones operate over a network often using a full-duplex communication channel that uses code-division or time division multiplexing.

The convergence of walkie-talkie radio communication and mobile telephone communication is often referred to as "push-to-talk" or "PTT," which offers a near instant connection between users. One example of a PTT system is Nextel's iDEN-based Push to Talk (also known as Direct Connect®) service. PTT systems may also be implemented using standard voice-over Internet protocol (VoIP) technologies or other IP telephony technologies, wherein voice information is sent in digital form over IP-based data networks. Such PTT systems are hereinafter referred to as "network-based instant connect systems" or "NBIC systems," and they can be deployed on many types of networks, including wireless and wireline networks.

A network-based instant connect call is a telephone call established using a network, but in a way that is designed to give the user the experience of a conventional or personal walkie-talkie call. For instance, in wireless networks, NBIC calls are initiated when the user selects a recipient from a contact list on the mobile device and presses the talk button. Likewise, NBIC calls are received by automatically activating the receiving device for immediate output of voice data without requiring the recipient to manually respond to a ring or other audible signal.

One shortcoming of network-based instant connect communication as compared to conventional mobile telephone communication is the absence of a voice messaging system. For example, a sending user may attempt to initiate a PTT or NBIC session with a receiving user only to discover that the receiving user is non-responsive, which may occur if the receiving user is busy, out of network coverage, lacking device power, unavailable, not near his or her communication device, or the like. The sending user may desire to leave a message for the receiving user but is unable to do so unless willing to take some additional action, such as sending the receiving user an SMS or MMS message; or making a regular telephone call, waiting for the receiving user's voicemail server to pick up the call, and then recording a voice message.

A similar problem occurs in both network-based instant connect communication and conventional mobile telephone communication when a call is already underway and the call terminates. Two users are communicating via a network-based instant connect call or a conventional mobile telephone call when the call is dropped or is otherwise terminated. The call may terminate because the network is overloaded, one or both of the users moves out of network coverage, a device has insufficient power or for any other reason. A sending user may be in the middle of explaining something to the receiving user, or may still have something to say to the receiving user when the call is terminated. The sending user may desire to leave the receiving user a voice message in order to complete the discussion or so that the sending user does not forget what was being discussed before having the opportunity to finish the discussion later. However, the sending user cannot leave a message for the receiving user without taking some additional action already discussed such as sending an MMS or SMS message or calling the receiving user to leave a voicemail or other voice message.

While conventional MMS, SMS, and voice messaging systems may be convenient in certain circumstances, none of these options permits a user to automatically and easily create a voice message after either a terminated network-based instant connect communication session with another user, or a terminated mobile phone communication session which is already underway before termination. What is needed, therefore, is improved voice messaging service to handle terminated communication sessions for both network-based instant connect communications and conventional mobile phone communications.

BRIEF SUMMARY OF THE INVENTION

These and other limitations are overcome by embodiments of the invention, which relate to systems and methods for providing voice messaging service in network-based instant connect sessions. Such voice messaging service can be used, by way of example, for terminated communication sessions between two or more devices, and in particular for terminated network-based instant connect sessions. According to one aspect of the invention, a sending device locally records a voice message addressed to a receiving device after a communication session between the two devices terminates.

Embodiments of the invention for providing voice messaging service for instant connect sessions, including terminated instant connect sessions, can be used in conjunction with wireless communication devices as well as land line devices.

In one embodiment of the invention, a sending device attempts to initiate a network-based instant connect session, a PTT session, or walkie-talkie session with a receiving device. The initiation request is denied or terminates before any voice data is exchanged between the two devices because the user of the receiving device does not respond within a certain time, the receiving device lacks sufficient power or is turned off, a network component such as a base transceiver station is malfunctioning, the cellular network is overloaded, or one or both devices are outside of a cellular network or are receiving weak or noisy radio signals, or for any other reason including situations where the voice data is delivered to a device but the sender is unsure that the voice data was heard. The sending device is notified of the session termination and records a voice message from the user of the sending device addressed to the receiving device. Once the cause of the session termination is resolved or the devices are otherwise reconnected to the wireless network, the voice message is transmitted to the receiving device.

In another embodiment of the invention, a sending device and a receiving device are engaged in half or full-duplex communication and have exchanged voice data when the communication session terminates. In this embodiment, as in the last, the sending device is notified of the session termination, records a sender's voice message addressed to the receiving device and transmits the voice message to the receiving device.

In some embodiments of the invention the sending device prompts the sender to create a voice message after being notified of the session termination, while in other embodiments of the invention the sending device automatically begins recording the voice message after receiving notification.

The voice message recorded using the sending device may be transmitted to the receiving device in a number of different ways after the sending and/or receiving devices are reconnected to the network. In one embodiment, the sending device transmits the voice message to the receiving device without the intervention of a message server or other intermediary. According to one aspect of this embodiment, the sending device stores the voice message on the sending device, transmits a message-waiting notification to the receiving device, waits for the receiving device to transmit a message request to it, and then transmits the voice message to the receiving device. According to another aspect, the sending device stores the voice message on the sending device and then transmits it to the receiving device without waiting for the receiving device to request the message. In another embodiment, the sending device transmits the voice message to a message server or other intermediary prior to the message being transmitted to the receiving device. According to one aspect of this embodiment, the message server transmits a message-waiting notification to the receiving device, waits for the receiving device to transmit a message request to it, and then transmits the voice message to the receiving device. According to another aspect, the message server transmits the voice message to the receiving device without waiting for the receiving device to request the voice message.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

The present invention relates to voice messaging systems. More particularly, embodiments of the invention relate to voice messaging in instant connect communications, including failed or interrupted communication sessions. Embodiments of the invention enable a sending device, such as a cellular telephone, to serve as a voice message system. The sending device, for example, can serve as a voice message system during a failed or interrupted communication session between two or more devices. When a communication session between devices fails or is interrupted or for any other reason, a sending device can be used to create and store a voice message that may be forwarded at a later time to a receiving device.

According to one embodiment of the invention, a sending device initiates or attempts to initiate a network-based instant connect communication session with a receiving device in a suitable network environment. The communication session between the two devices may fail to initiate, or if initiated it may be terminated for any one or more of various reasons. An attempt to initiate a communication session can fail, for example, if the sending device is out of coverage. As used herein, a communication session is "terminated" if it fails or is otherwise interrupted. Reasons for termination of a communication session include the user of the receiving device choosing not to respond, the user of the receiving device being unaware of the incoming communication, the user of the receiving device being on a voice call, one or the other device disconnecting from the network due to moving outside of the network, the receiving device running out of power, the receiving device being in an off state, the sending or receiving device being improperly provisioned for use on an instant connect system, the receiving device not being an instant connect communication device, the user of the receiving device not having subscribed to the instant connect communication service, the cellular network being overloaded, improperly configured routing rules in the network, a noisy or weak radio signal, or the failure of a network component such as a base transceiver station.

The network notifies the sending device of the communication session termination and the sending device records and stores locally a voice message for the receiving device. The voice message may alternatively be stored on an intermediary server assuming that the sending device has a connection at least to the server. Once a disconnected device is reconnected to the network, the message may be delivered to the receiving device. The message may remain on the sending device until forwarded to the receiving device, or it may be forwarded to a message server and later retrieved from the message server by the receiving device or forwarded by the message server to the recipient device.

Embodiments of the invention are therefore directed to messaging systems and, in particular, to systems and methods for providing voice messaging service for network-based instant connect systems. While embodiments of the invention are described in the context of network-based instant connect systems which traditionally utilize half-duplex communications, one of skill in the art can appreciate that embodiments of the invention also apply to other types of systems which may utilize full-duplex communications, such as traditional cellular telephone systems.

Figure 1:
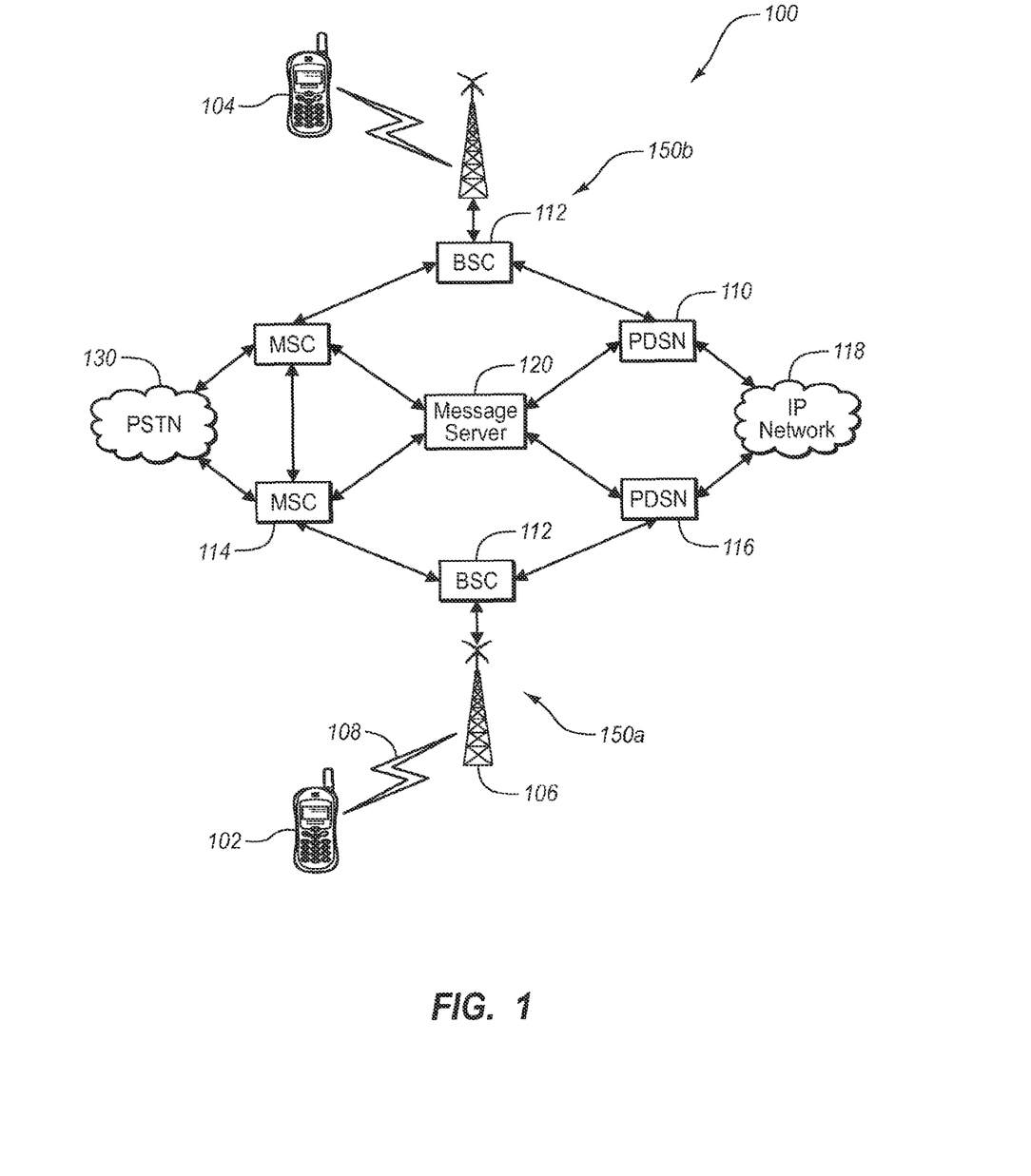
FIG. 1 is a block diagram illustrating a wireless network in which the voice messaging service of the invention may be practiced.

In order to describe the various methods of the invention, FIG. 1 illustrates an example of a network 100 in which the invention can be practiced. It is to be understood that the network of FIG. 1 represents only an example of the suitable environments in which the invention can be implemented, and that other network architectures, including wireline networks, are possible. The network 100 includes one or more wireless telephone networks that operate with network-based instant connect devices 102 and 104. In the illustrated example, the device 102 operates within a cellular network 150a, while the device 104 operates within a cellular network 150b.

FIG. 1 illustrates a base station 106 in the cellular network 150a that communicates with the network-based instant connect device 102 by transmitting and receiving radio signals 108. Base stations 106 and other base stations in the network 150a operate over respective regions or cells within which the radio signals 108 are sufficiently strong to provide reliable communication. In cellular networks, a grid of partially overlapping cells is positioned in a geographic area to provide service for the network-based instant connect devices anywhere in the range of the cells. The base station 106 may operate under the control of associated base station controllers 112, which may in turn be coupled with a packet data serving node (PDSN) 116. The base station 106 may also be coupled with a mobile switching center 114, which enables the device 102 to communicate with the public switched telephone network (PSTN) 130.

In the network 100 of FIG. 1, the network-based instant connect device 102 may acquire radio connectivity and IP network connectivity in a manner well known in the art. For example, the device 102 may issue an origination request to the mobile switching center 114, which may send the request back to the BSC 112. The BSC 112 may assign a traffic channel to the device 102, or it might forward the request to the PDSN 116, which works with the device 102 to establish a data link by which voice and data is transmitted to and received from the device. The device 102 may then initiate and participate in network-based instant connect communication sessions with the device 104 through the PDSN 116, which provides the device 102 with a gateway to the IP network 118. The devices 102 and 104 may also participate in traditional mobile-to-mobile communication sessions according to methods well known in the art.

The communication devices 102, 104 can be wireless or mobile telephones, Personal Digital Assistants (PDA), laptop computers, desktop computers, landline telephones or any other devices with a minimum capability of establishing a communication session over the cellular networks 150a and/or 150b. Further, the communication device 102 can be any device capable of receiving and capturing data that forms the body of a message and addressing information that identifies the recipient or the recipient wireless station 104 associated with the recipient. The communication device 104 can be any device capable of receiving and rendering the message captured by the communication device 102.

The communication devices 102, 104 engage in a communication session and the communication session is terminated either during initiation of the session or during the session itself. In one embodiment of the invention, the sending device 102 may record a message locally on the sending device 102 and store it on the sending device until it can be transmitted to the receiving device 104 at a later time. Alternatively, the sending device 102 may transmit the message to a message server 120 immediately after creation of the message or at a later time. The message server 120 may then transmit a message-waiting notification to the receiving device or forward the message to the receiving device in some other manner.

The message server 120 is a computer system that may comprise a Multimedia Messaging Service Center (MMSC) that receives and sends MMS messages, a conventional voicemail server that receives and sends voicemail messages, an email server that receives and sends email messages, a Short Message Service (SMS) Center that receives and sends SMS messages, a proprietary voice message server that receives and sends other types of messages, or any combination thereof. Accordingly, the messages captured by the sending device 102 and delivered to the receiving device 104 may comprise MMS messages, traditional voice messages, email messages, SMS messages, proprietary messages, or any combination thereof and can include voice data, text data, image data, and/or video data.

Figure 2:
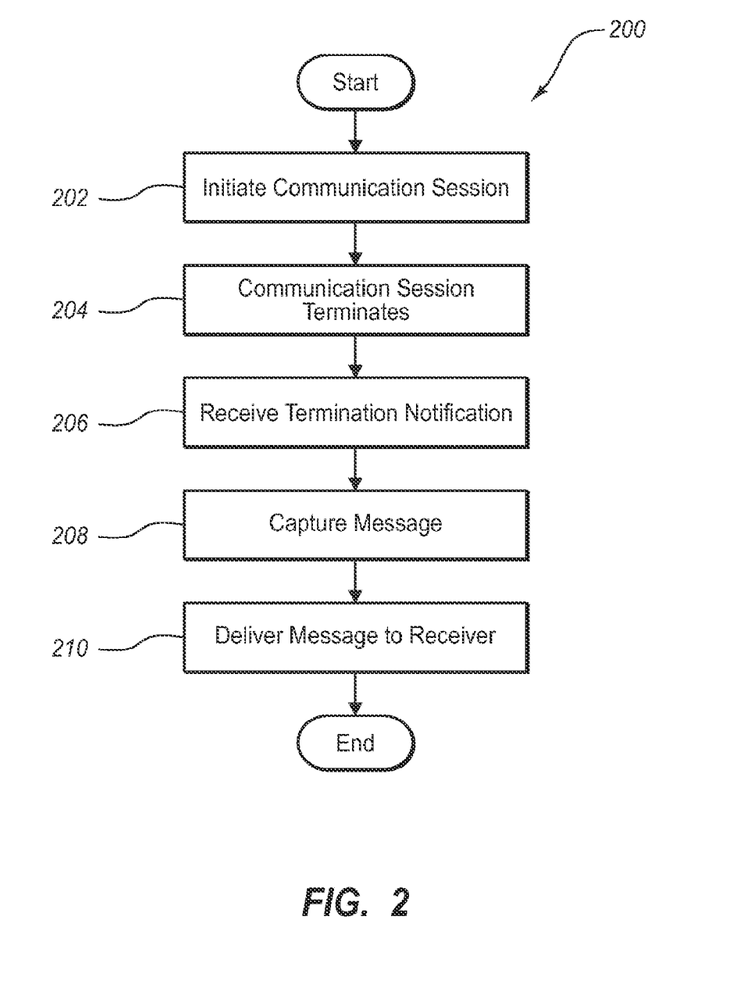
FIG. 2 is a flow diagram depicting one embodiment of a method by which voice messaging service may be provided for terminated communication sessions.

An embodiment of a method 200 for providing messaging services for terminated communication sessions is now described in reference to FIGS. 1 and 2. Sending device 102 or receiving device 104 submits 202 an initiation request for a communication session between the two devices. In other words, submitting an initiation request is an example of initiating or of attempting to initiate a communication session. In a typical embodiment, the communication session comprises a Network-Based Instant Connect communication session, or Push to Talk session, which usually utilize half-duplex communication, although other sessions and communication techniques are contemplated. In another embodiment, the communication session may comprise a conventional mobile-to-mobile communication session (referred to herein as a "call" or "voice call") utilizing full-duplex communication.

After the initiation request is submitted to one of the two networks 150a, 150b, the communication session terminates 204. The session may terminate either from the beginning (e.g., the initiation request is denied or the initiating device is out of network coverage) if the initiation request originates from the sending device 102, or after voice data are exchanged if the initiation request originates from either device. The communication session termination may be caused by any of the reasons previously described above, including an effective disconnection of one or both of the devices 102, 104 from the wireless communication network 100, such as by network overload, a noisy or weak radio signal, insufficient network coverage, insufficient/no device power, or any combination thereof. A communication termination also encompasses failure to initiate the communication session.

The termination of the communication session results in a notification 206 to the sending device of the session termination. For example, during an NBIC session, the sending device 102 attempts to transmit to the receiving device 104. If the receiving device 104 is out of network coverage or turned off or if the network is overloaded or there is a noisy or weak radio signal, the network transmits an error message apprising the sending device 102 that the receiving device is not available. Similarly, if the sending device 102 is out of network coverage, or for some other reason is unable to connect to the network, the device itself may be configured to detect and apprise the user of the sending device 102 of the problem. The sending device 102 may also be configured to generate a timeout error if the sending device 102 is communicating or attempting to communicate with the receiving device 104 in an NBIC communication session and the sending device 102 does not receive any response from the receiving device 104 within a certain amount of time.

In another embodiment of the invention, the devices may be engaged—or attempting to engage—in a traditional voice call when the call is dropped. When the call is dropped on the end of the network associated with the sending device 102, the sending device typically recognizes that its connection has been lost and can accordingly apprise the sending device user. When the connection is lost on the end of the network associated with the receiving device 104, an error notification may or may not be sent to the sending device 102. In some embodiments of the invention, the network 150b may be configured to monitor the connection of device 104 and send an error message to the sending device 102 when a communication session between the two devices prematurely terminates. In other embodiments of the invention, the sending device 102 or some other network component may generate a timeout error as described above.

The reception of the error or timeout message by the sending device 102 is followed by the sender (e.g., the user of the sending device 102) capturing 208 a message for the receiving device 104. The message can be captured and stored on the sending device 102 and/or captured and transmitted to a network component (e.g., the message server 120). The message may be an instant voice message created according to methods known in the art, including those disclosed in U.S. Pat. No. 7,013,155 and U.S. Pat. No. 7,133,687, both of which are herein incorporated by reference.

While the sending device 102 can be used to create a variety of messages as previously mentioned, in some embodiments the messages are instant voice messages. In general, two types of instant voice messages can be created by the sending device 102. The first type includes instant voice messages that include only voice content and utilize a messaging protocol other than MMS. The second type includes MMS-based instant voice messages or messages having other formats that include voice content and may include other types of multimedia content.

The sending device 102 may use a dedicated voice messaging process to create a voice message that does not rely on first unsuccessfully attempting to establish a live telephone call with the intended recipient, as has been required in order to use conventional voice mail systems. As used herein, the terms "instant voice messaging" and "instant voice messages" refer to voice messaging that does not require the use of conventional voice mail systems in which the sender must first make an unsuccessful attempt to establish a live telephone call with the recipient. Instead, a sender using an instant voice messaging system can cause an instant voice message to be created and sent to the recipient at a time of the sender's choosing.

In one embodiment of the invention, the sending device 102 advises the sender that the communication session has terminated and prompts the sender to record an instant voice message (or other message) for the user of the receiving device 104. The sender may be required to press a button once or twice to complete the message. For instance, the process of composing and transmitting an instant voice message (or other message) can begin by the sender pressing a designated button on the sending device 102 in response to the prompt to create the message. In response to the button input, the sending device 102 transitions to a mode in which it assists the sender in the process of composing the message. The sender can speak the name or phone number of the receiving device 104 in order to provide the address for the message, or the sending device 102 can automatically use the address of the receiving device 104 by reference to the address used in the just-terminated communication session.

As the message composition mode is activated, and as the message is composed and sent, the sending device 102 can output tones or verbal cues to guide the user through the process of creating and sending the message and to verify that the message is being composed and sent as intended. Alternately or additionally, the sending device can output a single prompt upon communication session termination without providing any other output tones or verbal cues to the user. In order to transmit the message after it is created, the sender may again press, if necessary, a button on the sending device 102. In other embodiments, either or both of the user inputs associated with depressing a button on the sender device 102 can be replaced with verbal commands. In another embodiment, the sending device 102 may automatically record a message upon receiving an error message, without requiring the sender to press a button or speak a voice command, or even without prompting the sender to record the message. In another embodiment the message can be automatically transmitted unless the sender specifically intervenes to stop transmission within a certain period of time after the message is created. In another embodiment, the sending device 102 may buffer a voice communication as the voice communication occurs. The buffered data can then be used as the message or as part of the message should the session later terminate.

Optionally, the user of the sending device can mark the message with a priority level, such as urgent priority, medium priority and/or low priority. Additionally, in some embodiments the user of the sending device can request delivery confirmation and/or a return receipt for the message.

Once the previously disconnected device is reconnected to the wireless communication network (and/or once the reason for termination of the communication session is resolved), the message may be delivered 210 to the receiving device 104. In one embodiment, the message is composed in the MMS format and both the sending device 102 and receiving device 104 comprise an MMS client. The MMS client on the sending device 102 uses HTTP or another appropriate protocol to submit the message to the sending MMSC. The sending MMSC transmits the message to the receiving MMSC and the receiving MMSC sends a notification to the receiving device 104 using an SMS notification, HTTP push, WAP push, or other notification. In some cases the sending MMSC, the receiving MMSC and the message server 120 operate as one integrated server, while in other cases they do not. The receiving device 104 may be configured to automatically retrieve the message from the receiving MMSC, or it may wait to retrieve the message until instructed to do so by the recipient (e.g., the user of the receiving device 104). If the communication session between the two devices 102 and 104 terminates because the sending device 102 is disconnected from the network, the message cannot be transmitted to the sending MMSC until the sending device 102 is reconnected to the network. Similarly, if the session terminates because the receiving device 104 is disconnected from the network, the instant voice message may be transmitted through the sending MMSC to the receiving MMSC, but it cannot be transmitted to the receiving device 104 until the device is reconnected to the network.

In another embodiment, the message is an instant voice message composed in a format including only voice content utilizing a messaging protocol other than MMS, and both the sending device 102 and receiving device 104 comprise a messaging client compatible with the utilized messaging protocol. The message may be delivered using a method similar to that used for MMS messages where the sending device 102 transmits the message to the message server 120, the message server sends a notification to the receiving device 104, and the receiving device 104 automatically retrieves the message, or retrieves the message when instructed to do so by the recipient. This method and all others discussed hereafter are subject to the same constraint as already discussed, namely that the message cannot be transmitted to or from a device unless the device is connected to the network.

In another embodiment, it is not necessary to utilize a message server 120 or another intermediary of the like such as an MMSC to deliver and/or store the message. Instead, the sending device 102 records the message and stores it locally. The sending device 102 may be configured to periodically attempt to reestablish a communication session with the receiving device 104. Once the session is reestablished, the sending device 102 may automatically transmit the message to the receiving device 104, or it may first transmit a notification to the receiving device 104, whereupon the message is not transmitted until the receiving device requests it. Upon receiving the message-waiting notification, the receiving device may automatically request the message or may require user input prior to requesting the message.

In another embodiment of the invention, the message is in a format incompatible with the messaging client or clients of the receiving device 104. The message server 120 may employ the methods of U.S. Pat. No. 7,013,155, issued Mar. 14, 2006, or of U.S. patent application Ser. No. 11/007,700, filed Dec. 8, 2004, which are incorporated herein by reference, to deliver the message to the receiving device 104 in a format compatible with the device. For example, the system may transcode an MMS message into a regular voice message and forward it to a voice mail server of the receiving device 104. The system may instead forward the message to an Interactive Voice Response (IVR) server and deliver a Short Message Service (SMS) message to the receiving device 104 explaining how to retrieve the message from the IVR server. The system could alternatively place a phone call to the receiving device 104 and play the message when the recipient answers. Alternate mechanisms can be used to deliver an MMS message in this method, including telephony networks such as VoIP and PSTN.

In another embodiment of the invention, the instant connect system, including one or more PDSNs (e.g., 110 or 116), an IP network 118, and/or a message server 120, can be used to deliver the message to the receiving device 104. According to this embodiment, the message is captured by the sending device 102 and transmitted to a location on the instant connect system where this and/or additional messages can be stored for the receiving device 104. The instant connect system can notify the receiving device 104 of the message in any of a number of ways and the receiving device can then request the message. In one embodiment, the instant connect system notifies the receiving device 104 of the message by initiating an instant connect communication session or voice call with the receiving device 104, which may be likely to be terminated since the communication session with the sending device 102 was previously terminated. The number from which the instant connect system attempts to reach the receiving device 102 may show up in a missed calls list of the receiving device. The user of the receiving device can then use a dial capability from the missed calls list to call the number and retrieve the message. Advantageously, such a system enables legacy devices configured solely for instant connect communication to receive voicemail.

Embodiments of the invention therefore contemplate delivering 210 the message to the receiving device in any of the manners already discussed, including using an MMSC to store and forward MMS messages; using a message server to store and forward other format messages; storing messages on the sending device and delivering them directly to the receiving device upon receiving a request from the receiving device; transcoding messages to a format compatible with a client of the receiving device prior to forwarding the messages to the receiving device; forwarding the messages to an IVR system, notifying the receiving device of waiting messages and permitting the receiving device to access messages through the IVR system; storing messages in a conventional voicemail server, placing a voice call to the receiving device, and playing the messages when the receiving device answers; and using an instant connect system to deliver messages. Furthermore, one or more components (such as the message server 120) of an instant connect system can automatically provision the receiving device 104 to enable receipt of messages.

Embodiments of the invention additionally permit an adjustment of the message notification and delivery mechanisms used in delivery of messages. As one non limiting example, consider the delivery of MMS messages. When an MMSC is unable to deliver a message-waiting notification to a receiving device (e.g., because the receiving device is out of network coverage), the MMSC typically waits a period of time prior to sending another message-waiting notification. The invention therefore contemplates adjusting parameters such as the period of time the MMSC waits prior to sending another message-waiting notification.

Thus, embodiments of the invention permit a sender to create a message and have it delivered to a recipient when a communications session between the two terminates. Advantageously, the sender is enabled to complete a sentence or thought that the sender may have been in the middle of communicating to the recipient at the time the session was terminated. Further, the message may be created without requiring the sender to first make an unsuccessful attempt to call the recipient.

Additionally, embodiments of the invention may be implemented in group network-based instant connect communication sessions and group voice calls. As used herein, a group communication session (whether NBIC or standard voice call) is a communication session wherein three or more devices (e.g., sending and/or receiving) participate. Methods for establishing group communication sessions are well-known in the art and will not be described in detail herein.

According to embodiments of the invention involving group communication sessions, a sending device can be used to capture and deliver a message to an entire group if the entire group communication session is terminated. Alternately, the sending device can be used to capture and deliver a message to a subset of the group if the communication session is only terminated with the subset of the group. Thus, any references to a receiving device herein can be construed to refer to a plurality of receiving devices corresponding to an entire group or to a subset of a group.

Optionally, recipients of messages sent to groups (or subsets thereof) can reply to the messages by creating messages of their own. Alternately or additionally, after receiving a message, these recipients may press a button or buttons on their receiving devices to initiate an NBIC communication session with the sending device (e.g., the device from which the particular message originated), or to initiate an NBIC communication session with the whole group. These options may be in addition to pressing a button to initiate a standard voice call with the sending device and/or the whole group.

Figure 3:
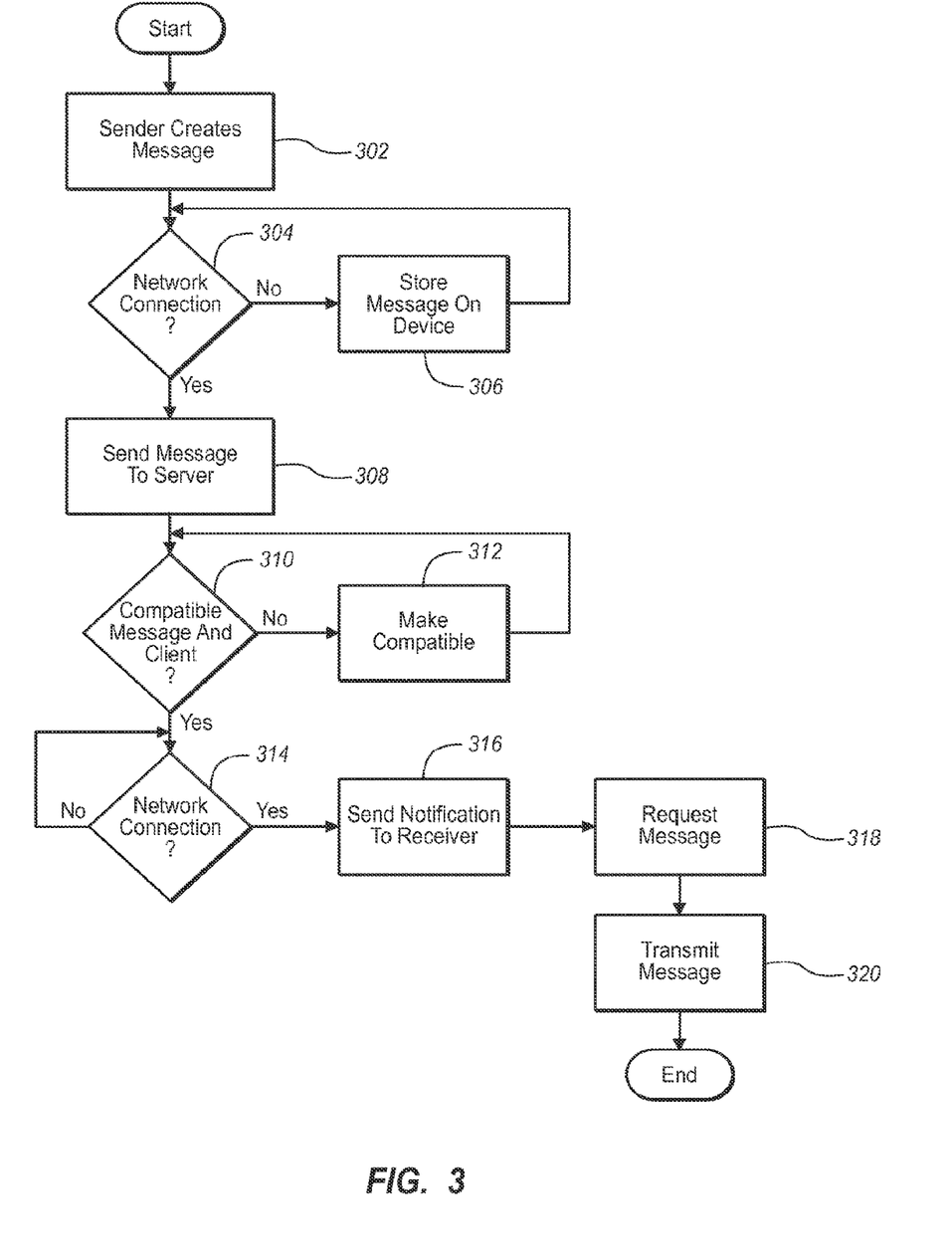
FIG. 3 is a flow diagram illustrating one embodiment of a method for utilizing an intermediary message server to provide voice messaging service for terminated communication sessions.
Figure 4:
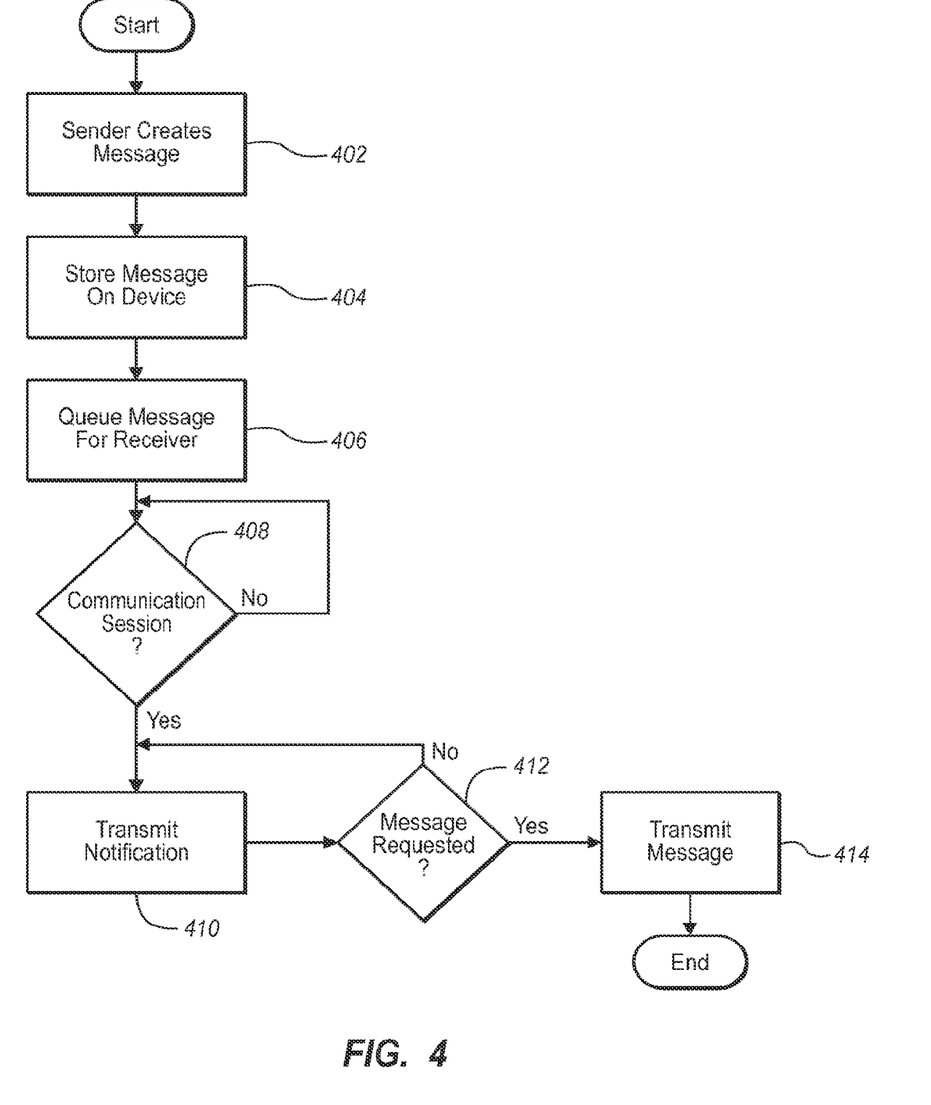
FIG. 4 is a flow diagram illustrating one embodiment of a method for providing voice messaging service for terminated communication sessions without using a message server.

FIGS. 3 and 4 provide details concerning the delivery of a message to a receiving device 104. FIG. 3 illustrates a method that may be used in conjunction with a store and forward technique utilizing intermediate stations such as a message server or MMSC, while FIG. 4 illustrates a method that may be implemented without utilizing an intermediate station.

With particular reference now to FIG. 3, a sender creates 302 a message, such as a voice message, an instant voice message, an email message, an MMS message, or the like, using one of the methods described herein or some other method known in the art. The message is typically created after a communication session between a sending device and a receiving device terminates, although messages can also be created without first initiating a communication session. Additionally, the message may be created without first requiring the sending device to unsuccessfully establish a voice call with the receiving device. After creating the message the sending device determines 304 whether it has a network connection. In the event that the sending device lacks a network connection, the message is stored 306 or remains stored on the sending device until the device is able to connect to the network. Once the sending device connects to the network, it sends 308 the message to the message server. In the case of an MMS instant voice message, this may be accomplished using HTTP with specialized commands and encoding. However, other protocols may be used to send an MMS and other format messages to the message server.

In another embodiment, a network connection may already be established when a communication session terminates. According to this embodiment, a message server or other network component may store the message without the message ever being permanently stored on the sending device. The sending device may simply serve as a means to capture and transmit the message to the message server or other network component.

Returning to FIG. 3, the message server may determine 310 whether the message is compatible with the intended recipient, and if it is not compatible, the message server may make 312 the message compatible. This may be done according to methods disclosed in U.S. Pat. No. 7,013,155, or in U.S. patent application Ser. No. 11/007,700, and may involve transcoding the instant voice message into a different format, forwarding the instant voice message to an IVR server and sending an SMS notification explaining to the recipient how to retrieve the message from an interactive voice message server. In another embodiment, the voice message may be formatted for and delivered to the voice mail inbox of the recipient device.

The message server must also determine 314 whether the receiving device is connected to the network and once the device is connected to the network, the message server sends 316 a notification to the receiving device apprising the user of a waiting message. The notification may take the form of an SMS notification, HTTP push or WAP push, as used in conjunction with an MMS notification, or the notification may use some other format or protocol. The notification can include a phone number in a text message or in a missed calls list, and the receiving device can establish a communication session with this phone number in order to retrieve the message. The receiving device may request 318 the message thereafter, either automatically and transparently to the recipient, or when instructed to do so by the recipient, and finally the message server transmits 320 the message to the receiving device. In another embodiment of the invention, the server makes a voice call to the receiving device and automatically plays the message when the call is answered, rather than sending a notification first and awaiting a request from the receiving device.

Turning attention now to FIG. 4, a sender creates 402 a message after a terminated NBIC or voice call communication session using one of the methods described herein or some other method known in the art, and stores 404 the message locally on the device. The message is queued up 406 to be sent to the receiving device if the receiving device responds to a message notification. Transparently to the sender, the sending device attempts to reestablish a communication session with the receiving device. If the session is not successfully initiated 408, the sending device attempts to reestablish the session again at a later time. If the session is successfully initiated 408, the sending device transmits 410 a notification to the receiving device that a message is waiting for the recipient. The notification may be an audible notification indicating that the recipient may receive the instant voice message by pressing the "talk" button or by providing some other input. Alternately, the notification can be transparent to the recipient, such that the receiving device can automatically request the message without user input.

If the message is requested 412 by pressing the "talk" button or providing the specified input, a PTT session is initiated by the receiving device with the sending device, and the sending device automatically transmits 414 the message queued up for the receiving device. Alternately, the sending device can transmit 414 the message in response to an automatic request from the receiving device. If the message is not requested 412, the sending device may re-transmit the message-waiting notification to the receiving device. The sending device may continue to transmit message-waiting notifications indefinitely until the receiving device requests the message, or it may be configured to transmit only a limited number of notifications.

It should be understood that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Embodiments of the present invention may be implemented in connection with a special purpose or general purpose telecommunications device, including wireless telephones and other telephony-enabled mobile devices, landline telephones, or special purpose or general purpose computers that are adapted to have telecommunications or data networking capabilities such as cable set top boxes or PCs.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a sending communication device communicably connectable to one or more receiving communication devices, the sending communication device configured for creating and delivering a voice message after a terminated push-to-talk session, the sending communication device configured to:
   in response to a termination of a push-to-talk session in which the sending communication device participated by sending audio via the push-to-talk session prior to its termination and in which one or more of the receiving communication devices participated by receiving and playing the audio sent via the push-to-talk session prior to its termination, automatically provide a prompt to create a voice message;
   in response to receiving user input replying to the prompt that was automatically provided in response to the termination of the push-to-talk session, create and store a voice message for a first receiving communication device that participated in the terminated push-to-talk session;
   send a notification to the first receiving communication device informing the first receiving communication device of the voice message stored on the sending communication device; receive a request, from the first receiving communication device, to initiate a second push-to-talk session with the first receiving communication device; and
   upon establishing the second push-to-talk session with the first receiving communication device, automatically send the voice message to the first receiving communication device over the second push-to-talk session.

2. The system of claim 1, wherein at least one of the sending communication device and the first receiving communication device comprises a mobile telephone.

3. The system of claim 1, wherein the prompt to create the voice message is automatically provided in response to the push-to-talk session being terminated based on a network that carried the push-to-talk session being overloaded.

4. The system of claim 1, wherein the prompt to create the voice message is automatically provided in response to the push-to-talk session being terminated based on improperly configured routing rules in a network that carried the push-to-talk session.

5. The system of claim 1, wherein the prompt to create the voice message is automatically provided in response to the push-to-talk session being terminated based on a failure of a network component of a network that carried the push-to-talk session.

6. The system of claim 1, wherein the prompt to create the voice message is automatically provided in response to the push-to-talk session being terminated based on a noisy radio signal of the sending communication device.

7. The system of claim 1, wherein the prompt to create the voice message is automatically provided in response to the push-to-talk session being terminated based on a noisy radio signal of the first receiving communication device.

8. The system of claim 1, wherein the prompt to create the voice message is automatically provided in response to the push-to-talk session being terminated based on a weak radio signal of the sending communication device.

9. The system of claim 1, wherein the prompt to create the voice message is automatically provided in response to the push-to-talk session being terminated based on a weak radio signal of the first receiving communication device.

10. A sending communication device communicably connectable to one or more receiving communication devices, the sending communication device configured for creating and delivering a voice message after a terminated push-to-talk session, the sending communication device configured to:
   in response to a termination of a push-to-talk session in which the sending communication device participated by sending audio via the push-to-talk session prior to its termination and in which one or more of the receiving communication devices participated by receiving and playing the audio sent via the push-to-talk session prior to its termination, automatically provide a prompt to create a voice message;

in response to receiving user input replying to the prompt that was automatically provided in response to the termination of the push-to-talk session, create and store a voice message for a first receiving communication device that participated in the terminated push-to-talk session;

send a notification to the first receiving communication device informing the first receiving communication device of the voice message stored on the sending communication device;

receive a request, from the first receiving communication device, to initiate a second push-to-talk session with the first receiving communication device; and upon establishing the second push-to-talk session with the first receiving communication device, automatically send the voice message to the first receiving communication device over the second push-to-talk session.

11. The device of claim 10, wherein at least one of the sending communication device and the first receiving communication device comprises a mobile telephone.

12. The device of claim 10, wherein the prompt to create the voice message is automatically provided in response to the push-to-talk session being terminated based on a network that carried the push-to-talk session being overloaded.

13. The device of claim 10, wherein the prompt to create the voice message is automatically provided in response to the push-to-talk session being terminated based on improperly configured routing rules in a network that carried the push-to-talk session.

14. The device of claim 10, wherein the prompt to create the voice message is automatically provided in response to the push-to-talk session being terminated based on a failure of a network component of a network that carried the push-to-talk session.

15. The device of claim 10, wherein the prompt to create the voice message is automatically provided in response to the push-to-talk session being terminated based on a noisy radio signal of the sending communication device.

16. The device of claim 10, wherein the prompt to create the voice message is automatically provided in response to the push-to-talk session being terminated based on a noisy radio signal of the first receiving communication device.

17. The device of claim 10, wherein the prompt to create the voice message is automatically provided in response to the push-to-talk session being terminated based on a weak radio signal of the sending communication device.

18. The device of claim 10, wherein the prompt to create the voice message is automatically provided in response to the push-to-talk session being terminated based on a weak radio signal of the first receiving communication device.

* * * * *